United States Patent
Duhua

(10) Patent No.: US 6,744,172 B2
(45) Date of Patent: Jun. 1, 2004

(54) HEAT-DISSIPATING FAN

(75) Inventor: Sun Duhua, Shanghai (CN)

(73) Assignee: Yen Sun Technology Corp., Kaohsiung Hsien (TW)

( * ) Notice: Subject to any disclaimer, the term of this patent is extended or adjusted under 35 U.S.C. 154(b) by 0 days.

(21) Appl. No.: 10/245,496

(22) Filed: Sep. 18, 2002

(65) Prior Publication Data

US 2004/0051418 A1 Mar. 18, 2004

(51) Int. Cl.⁷ .............................................. H02K 1/12
(52) U.S. Cl. ...................... 310/254; 310/216; 310/259; 29/596
(58) Field of Search ................................ 310/254, 258, 310/259, 216; 29/596, 609

(56) References Cited

U.S. PATENT DOCUMENTS

| | | | | |
|---|---|---|---|---|
| 4,363,987 A | * | 12/1982 | Vorotyntseva et al. | 310/216 |
| 4,459,087 A | * | 7/1984 | Barge | 417/356 |
| 4,553,075 A | * | 11/1985 | Brown et al. | 318/254 |
| 4,563,622 A | * | 1/1986 | Deavers et al. | 318/254 |
| 4,698,537 A | * | 10/1987 | Byrne et al. | 310/168 |
| 5,365,137 A | * | 11/1994 | Richardson et al. | 310/258 |
| 5,627,424 A | * | 5/1997 | Steiner | 310/258 |
| 5,659,218 A | * | 8/1997 | Kliman et al. | 310/254 |
| 5,701,047 A | * | 12/1997 | Johnson | 310/254 |
| 5,729,071 A | * | 3/1998 | Steiner | 310/254 |
| 5,757,108 A | * | 5/1998 | Suzuki | 310/49 R |
| 5,859,486 A | * | 1/1999 | Nakahara et al. | 310/254 |
| 5,880,551 A | * | 3/1999 | Prudham | 310/254 |
| 5,927,249 A | * | 7/1999 | Ackermann et al. | 123/399 |
| 5,973,426 A | * | 10/1999 | Fujinaka et al. | 310/49 R |
| 6,043,574 A | * | 3/2000 | Prudham | 310/49 R |
| 6,153,952 A | * | 11/2000 | Ito et al. | 310/36 |
| 6,160,330 A | * | 12/2000 | Sakamoto | 310/49 R |
| 6,188,159 B1 | * | 2/2001 | Fan | 310/254 |
| 6,313,553 B1 | * | 11/2001 | Gandel et al. | 310/36 |
| 6,320,285 B1 | * | 11/2001 | Ito et al. | 310/36 |
| 6,323,571 B1 | * | 11/2001 | Nakahara et al. | 310/71 |
| 6,362,553 B1 | * | 3/2002 | Nakahara et al. | 310/254 |
| 6,384,496 B1 | * | 5/2002 | Pyntikov et al. | 310/68 B |
| 6,492,756 B1 | * | 12/2002 | Maslov et al. | 310/156.12 |
| 6,657,335 B2 | * | 12/2003 | Totsuka | 310/68 B |

FOREIGN PATENT DOCUMENTS

| | | | | |
|---|---|---|---|---|
| GB | 2005089 | * | 10/1978 | H02K/17/04 |
| JP | 01194840 | * | 8/1989 | H02K/17/12 |
| JP | 01194841 | * | 8/1989 | H02K/17/12 |

* cited by examiner

Primary Examiner—Nicholas Ponomarenko
Assistant Examiner—Heba Elkassabgi
(74) Attorney, Agent, or Firm—Birch, Stewart, Kolasch & Birch, LLP

(57) ABSTRACT

A heat-dissipating fan comprises a rotor and a stator. The rotor includes a ring magnetic mounted to an outer periphery thereof. The stator includes a core. A plurality of poles integrally extend from the core of the stator. An induction coil is wound around at least one of the poles and located on an end of the pole. The heat-dissipating fan has only one stator having only one core with even-numbered poles integrally extending from the core. The fan wheel can be smoothly driven while increasing the amount of air output and improving the heat-dissipating efficiency. Further, since the poles are integral with the core, a closed loop of the magnetic field is formed when cooperating with the inductive ring magnet, thereby preventing magnetic field leakage.

2 Claims, 5 Drawing Sheets

HEAT-DISSIPATING FAN

BACKGROUND OF THE INVENTION

1. Field of the Invention

The present invention relates to a heat-dissipating fan. In particular, the present invention relates to a heat-dissipating fan used in computers or electronic equipment, the heat-dissipating fan having a single stator located outside the fan wheel.

2. Description of the Related Art

It is common to use a heat-dissipating fan in a computer or electronic equipment. FIG. 1 of the drawings illustrates a conventional heat-dissipating fan 1, in which a stator 10 is placed in a middle portion of an interior space of a fan wheel 12, and fan blades 14 are provided on an outer periphery of the fan wheel 12. The heat-dissipating fan 1 is coupled to a fin unit 2 for dissipating heat generated by a heat-generating element 3 such as a central processing unit. In operation, the stator 10 and the fan wheel 12 occupies most part of a central portion of the fin unit 2 such that no wind could enter this part. However, the heat generated by the heat-generating element 3 concentrates in the central portion of the fin unit 2 (see the circled portion A). As a result, the air output by the heat-dissipating fan 1 could not match the heat distribution. Namely, no wind is provided for the hottest central portion, and a large amount of air is provided for the remaining area having a lower temperature. The cooling effect is poor, and a considerable amount of energy is required if it is desired to cool the heat-generating element 3 to the desired extent.

FIG. 2 illustrates another conventional heat-dissipating fan 4 designed for eliminating the drawback of the heat-dissipating fan 1 in FIG. 1. The heat-dissipating fan 4 includes a ring magnet 40 mounted around the fan blades 42, and four single-poled stators 44 are mounted around the ring magnet 40 and spaced at regular intervals. The wind output problem of the heat-dissipating fan 1 in FIG. 1 is solved. Further, the effective diameter of the fan blades 42 is increased, which increases not only the amount of air output but also the area of air output. A better heat-dissipating effect is provided. However, the four single-poled stators 44 are close to one another, resulting in difficult fixing of the stators 44 and difficult connection between the coils of the stators 44. The overall weight of the heat-dissipating fan 4 is increased. Further, since the core of each it single-poled stator 44 lacks a direct loop for the magnetic field, the electromagnetic power loss is large and the efficiency is poor.

SUMMARY OF THE INVENTION

It is the primary object of the present invention to provide a heat-dissipating fan for eliminating the above-mentioned drawbacks. The heat-dissipating fan in accordance with the present invention provides the advantages of: increasing the amount of air output, improving the heat-dissipating efficiency, reducing the overall weight, reducing the manufacture difficulty, reducing the manufacture cost, having a small electromagnetic power loss, and having a high efficiency.

A heat-dissipating fan in accordance with the present invention comprises a rotor and a stator. The rotor includes a ring magnetic mounted to an outer periphery thereof. The stator includes a core. A plurality of poles integrally extend from the core of the stator. An induction coil is wound around at least one of the poles and located on an end of the pole.

In an embodiment of the invention, there are two poles integrally extending from the core of the stator, providing a U-shaped structure for said core.

Other objects, specific advantages, and novel features of the invention will become more apparent from the following detailed description and preferable embodiments when taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment in accordance with the present invention will now be described with reference to the accompanying drawings.

Figure 1:
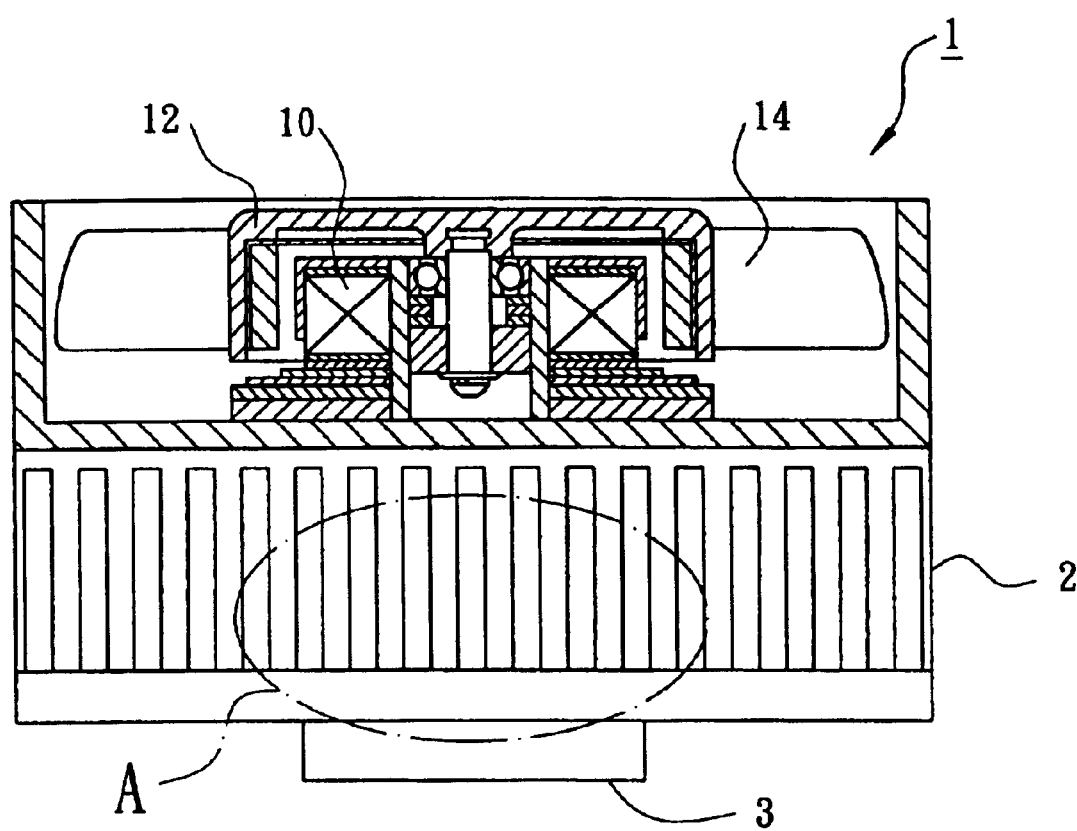
FIG. 1 is a sectional view of a conventional heat-dissipating fan.
Figure 2:
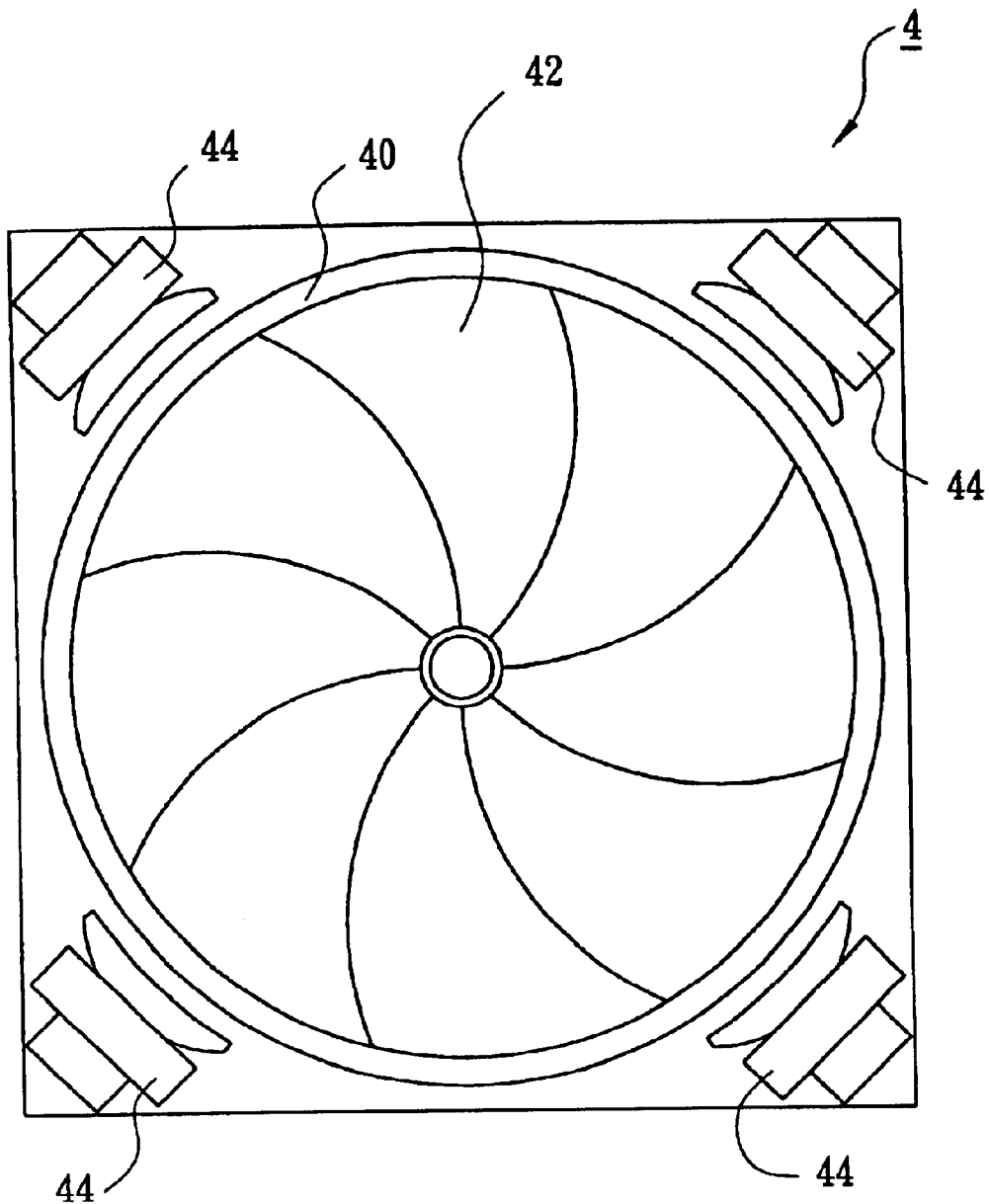
FIG. 2 is a top view of another conventional heat-dissipating fan.
Figure 3:
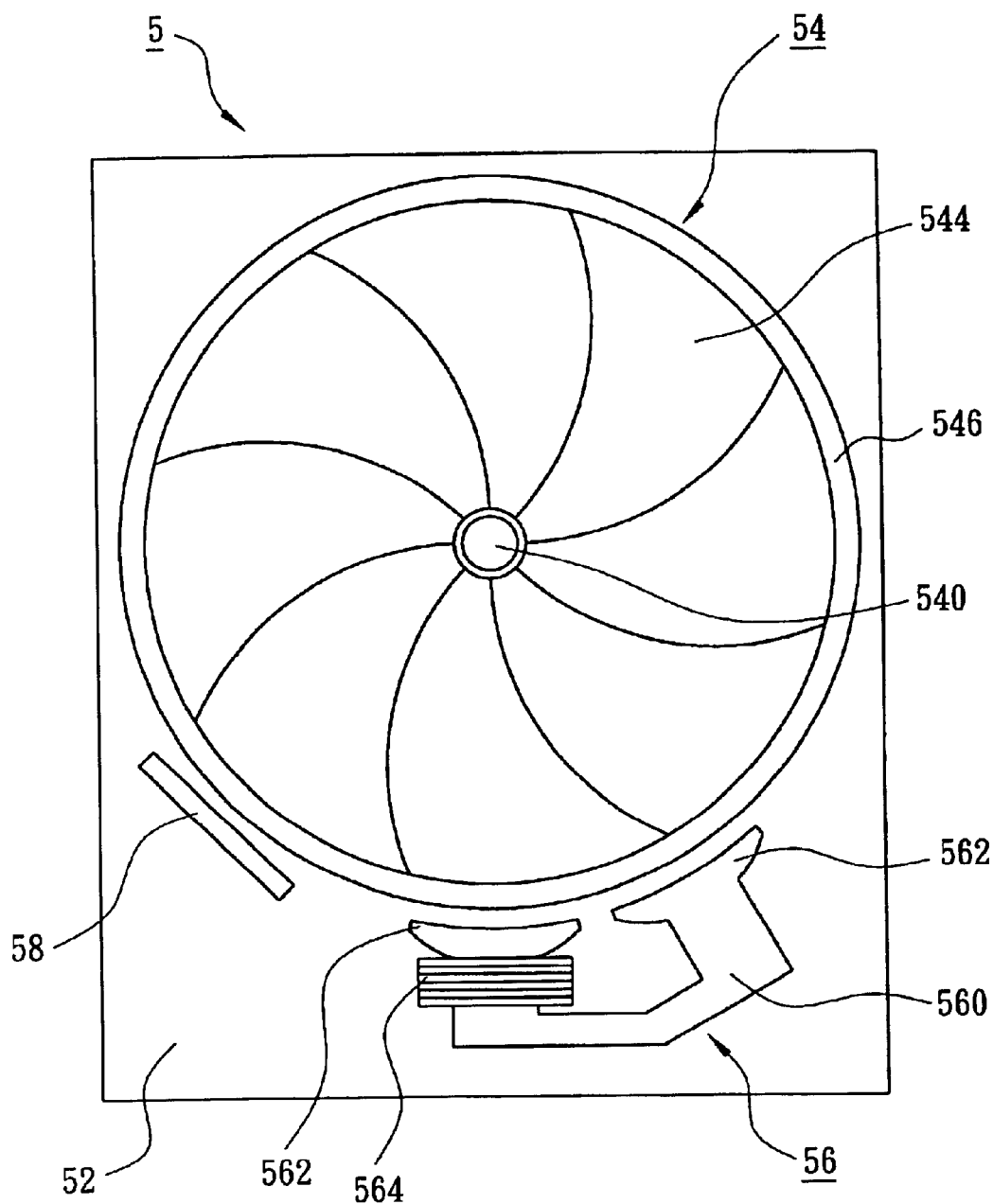
FIG. 3 is a top view of a heat-dissipating fan in accordance with the present invention.
Figure 4:
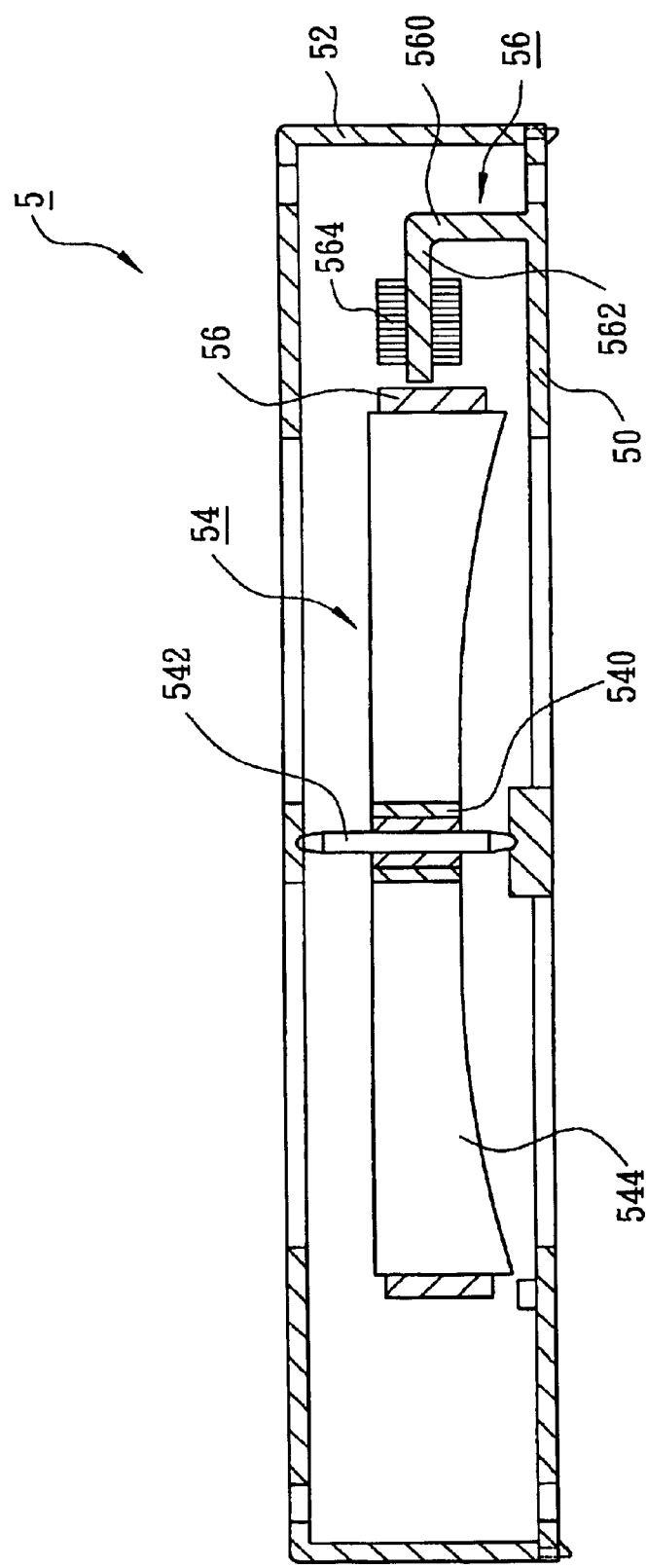
FIG. 4 is a sectional view of the heat-dissipating fan in accordance with the present invention.

Referring to FIGS. 3 and 4, a heat-dissipating fan 5 in accordance with the present invention generally includes a main board 50, a housing 52 mounted on the main board 50, a fan wheel 54 mounted between the main board 50 and the housing 52, and a stator 56 mounted on the main board 50 and located outside the fan wheel 54 for effecting induction with the fan wheel 54 to thereby drive the fan wheel 54.

A control member 58 is mounted on the main board 50. The fan wheel 54 includes a hub 540 for receiving a shaft 542. A plurality of fan blades 544 are mounted to an outer periphery of the hub 540. Securely mounted around an outer periphery of the fan blades 544 is a ring magnet 546 for effecting induction with the stator 56. The fan blades 544 and ring magnet 546 thus form a rotor. The stator 56 includes a core 560 and even-numbered poles 562 integrally extending from the core 560. There are two poles 562 in this embodiment, forming a U-shaped core 562. An induction coil 564 is wound around at least one of the poles 562.

Figure 5:
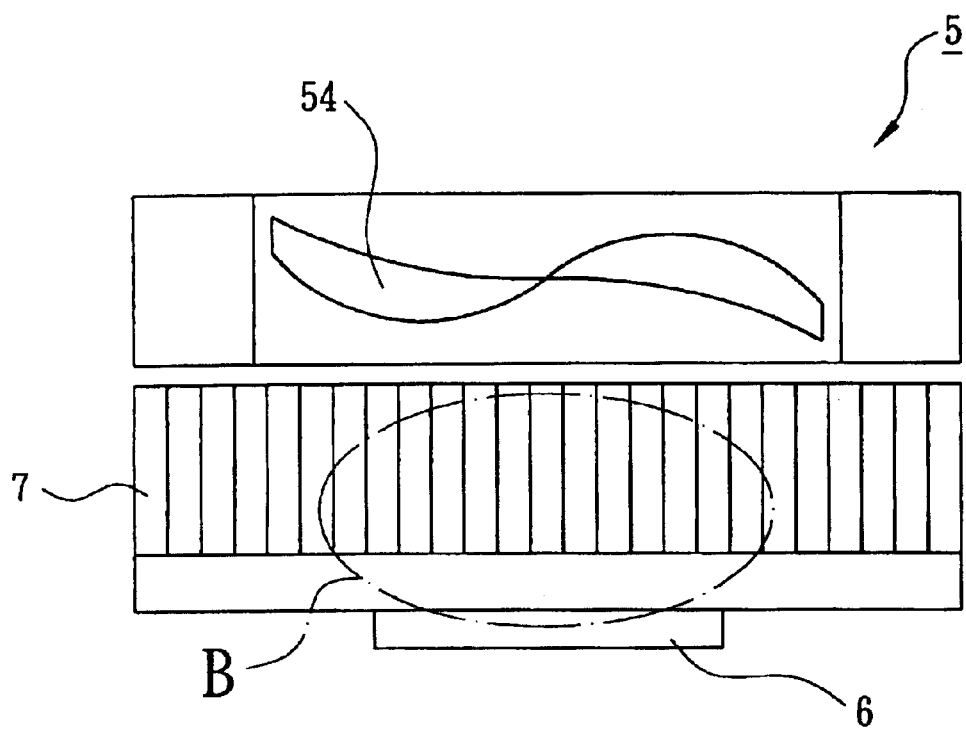
FIG. 5 is a schematic view illustrating operation of the heat-dissipating fan in accordance with the present invention.

Still referring to FIGS. 3 and 4 and further to FIG. 5, in operation, when the induction coil 564 is energized by providing electricity, the induction coil 564 inducts with the inductive ring magnet 564 around the fan blades 544 of the hub 540. Since the fan wheel 4 is located in a central area of the heat-dissipating fan 5, the outputted air directly blows toward the hottest central area "B" (see the circled area in FIG. 5) on a fin unit 7 mounted on top of a heat-generating element 6. A better heat-dissipating effect is provided, as, the effective diameter of the fan is large. Further, since the poles 562 are integral with and extended from the core 560 of the stator 56 to form a U-shaped structure, this U-shaped structure and the inductive ring magnet 546 on the fan wheel 54 together forms a closed loop of magnetic field, preventing leakage of the magnetic field. Thus, the overall electromagnetic power loss is significantly reduced, and the efficiency is improved. The electricity consumed is saved by about 25 percents. Further, since there is only one stator 56 in this embodiment, the overall weight of the heat-dissipating fan 5 is reduced, allowing easy manufacture and reducing the manufacture cost, which meets the need of portable computers.

According to the above description, it is appreciated that the heat-dissipating fan 5 in accordance with the present invention has only one stator 56 having only one core 560 with even-numbered poles 562 integrally extending from the core 560. The fan wheel 54 can be smoothly driven while increasing the amount of air output and improving the heat-dissipating efficiency. Further, since the poles 562 are integral with the core 560, a closed loop of the magnetic field is formed when cooperating with the inductive ring magnet 546, thereby preventing magnetic field leakage. Further, since there is only one stator 56, the overall weight of the heat-dissipating fan 5 is reduced, and only one winding procedure is required for this stator 56. The manufacture procedure for the heat-dissipating fan 5 is simplified, and the manufacture cost for the heat-dissipating fan 5 is reduced.

Thus, the drawbacks of conventional designs are eliminated, and the heat-dissipating fan in accordance with the present invention provides the advantages of: increasing the amount of air output, improving the heat-dissipating efficiency, reducing the overall weight, reducing the manufacture difficulty, reducing the manufacture cost, having a small electromagnetic power loss, and having a high efficiency.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A heat-dissipating fan comprising:
    a rotor including a ring magnet mounted to an outer periphery thereof; and
    a stator including a single core, a pair of poles integrally extending from said core of said stator and commonly facing the ring magnet, a single induction coil being wound on said pair poles and located on an end of said at least one of said poles.

2. The heat-dissipating fan as claimed in claim 1, wherein the poles integrally extend from said core of said stator and provide a U-shaped structure for said core.

* * * * *